United States Patent
Seo et al.

(10) Patent No.: US 9,413,450 B2
(45) Date of Patent: Aug. 9, 2016

(54) SIGNAL TRANSMISSION METHOD USING MBSFN SUBFRAME IN RADIO COMMUNICATION SYSTEM

(75) Inventors: Han Byul Seo, Anyang-si (KR); Byoung Hoon Kim, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 134 days.

(21) Appl. No.: 13/143,331

(22) PCT Filed: Jan. 12, 2010

(86) PCT No.: PCT/KR2010/000186
§ 371 (c)(1),
(2), (4) Date: Jul. 5, 2011

(87) PCT Pub. No.: WO2010/082752
PCT Pub. Date: Jul. 22, 2010

(65) Prior Publication Data
US 2011/0267997 A1     Nov. 3, 2011

Related U.S. Application Data

(60) Provisional application No. 61/144,460, filed on Jan. 14, 2009, provisional application No. 61/144,744, filed on Jan. 15, 2009, provisional application No. 61/250,835, filed on Oct. 12, 2009.

(30) Foreign Application Priority Data

Jun. 1, 2009     (KR) .................. 10-2009-0048045

(51) Int. Cl.
*H04B 7/155*     (2006.01)
(52) U.S. Cl.
CPC ................ *H04B 7/15542* (2013.01)

(58) Field of Classification Search
None
See application file for complete search history.

(56) References Cited

U.S. PATENT DOCUMENTS

2002/0119783 A1\*   8/2002   Bourlas et al. ............... 455/453
2008/0080436 A1    4/2008   Sandhu et al.
(Continued)

FOREIGN PATENT DOCUMENTS

CN     101146263     3/2008
JP     2008-104184     5/2008

OTHER PUBLICATIONS

Ericsson, "Efficient support of relays through MBSFN subframes", R1-084357, TSG-RAN WG1 #55, Nov. 2008, 3 pages.\*
(Continued)

*Primary Examiner* — Huy D Vu
*Assistant Examiner* — James P Duffy
(74) *Attorney, Agent, or Firm* — Lee, Hong, Degerman, Kang & Walmey; Jonathan Kang; Michael Monaco

(57) ABSTRACT

A signal transmission method using a multicast broadcast single frequency network (MBSFN) subframe in a radio communication system is provided. The method includes: selecting a plurality of relay stations for transmitting a plurality of backhaul signals, and transmitting the plurality of backhaul signals to the selected respective relay stations by using different radio resources, wherein each of the selected relay stations configures a subframe for receiving each of the plurality of backhaul signals as the MBSFN subframe. Accordingly, the backhaul signal can be transmitted between the base station and the plurality of relay stations by effectively using the radio resources.

8 Claims, 18 Drawing Sheets

(56) References Cited

U.S. PATENT DOCUMENTS

2008/0188231 A1 8/2008 Zhu et al.
2009/0252075 A1* 10/2009 Ji et al. .......................... 370/312
2010/0080166 A1* 4/2010 Palanki et al. ................ 370/315
2010/0120442 A1* 5/2010 Zhuang et al. ................ 455/450

OTHER PUBLICATIONS

Fang-Ching Ren, et al., "Recommendation on PMP Mode Compatible TDD Frame Structure", IEEE C802.16mmr-05/027r1, IEEE 802.16 Presentation Submission Template (Rev.8.3), Nov. 2005, 9 pages.
Motorola, "LTE signaling to support Relay operation", R1-084412, 3GPP TSG RAN WG1 Meeting #55, Nov. 2008, 7 pages.
Motorola, "LTE-A Relay support via existing MBSFN signaling (10ms vs. 8ms periodicity)", R1-084535, 3GPP TSG RAN WG1 Meeting #55, Nov. 2008, 2 pages.
Nortel Networks, "Control Channel and Data Channel Design for Relay Link in LTE-Advanced", R1-090153, TSG-RAN1 #5, Jan. 2009, 17 pages.
Qualcomm Europe, "Support of Rel-8 UEs by LTE-A Relays", R1-084384, 3GPP RAN WG1#55, Nov. 2008, 20 pages.
Qualcomm Europe, "Comparing Relay Support with MBSFN and Blank Subframes", R1-084515, 3GPP TSG RAN WG1 #55 Meeting, Nov. 2008, 4 pages.
Japan Patent Office Application Serial No. 2011-546209, Office Action dated Oct. 16, 2012, 4 pages.
Ren, et al., "Recommendation on PMP Mode Compatible TDD Frame Structure," IEEE 802.16 Presentation Submission Template (Rev. 8.3), IEEE C802.16mmr-05/027r1, Sep. 2005,16 pages.
Japan Patent Office Application Serial No. 2011-546209, Office Action dated Sep. 3, 2013, 3 pages.
LG Electronics, "Comparison of in-band relaying methods in FDD mode," 3GPP TSG RAN WG1 Meeting #55bis, R1-090223, Jan. 2009, 7 pages.
State Intellectual Property Office of the People's Republic of China Application Serial No. 201080004638.2, Office Action dated Aug. 1, 2013, 8 pages.
LG Electronics, "Consideration on Resource Allocation for Relay Backhaul Link," 3GPP TSG RAN WG1 Meeting #55bis, R1-090222, Jan. 2009, 6 pages.
Motorola, "Frame Structure and Signaling to Support Relay Operation," 3GPP TSG RAN1 #55bis, R1-090331, Jan. 2009, 4 pages.
European Patent Office Application Serial No. 10731367.8, Search Report dated Nov. 24, 2014, 7 pages.
Ren, et al., "Recommendation on PMP Mode Compatible TDD Frame Structure," IEEE 802.16 Presentation Submission Template (Rev. 8.3), IEEE C802.16mmr-05/027r1, Sep. 2005, 16 pages.
Motorola, "LTE signaling to support Relay operation," 3GPP TSG RAN WG1 Meeting #55, R1-084412, Nov. 2008, 6 pages.
Korean Intellectual Property Office Application Serial No. 10-2009-0048045, Office Action dated Jan. 27, 2015, 3 pages.

* cited by examiner

SIGNAL TRANSMISSION METHOD USING MBSFN SUBFRAME IN RADIO COMMUNICATION SYSTEM

CROSS-REFERENCE TO RELATED APPLICATIONS

This application is the National Stage filing under 35 U.S.C. 371 of International Application No. PCT/KR2010/000186, filed on Jan. 12, 2010, which claims the benefit of earlier filing date and right of priority to Korean Application No. 10-2009-0048045, filed on Jun. 1, 2009, and also claims the benefit of U.S. Provisional Application Ser. Nos. 61/250,835, filed on Oct. 12, 2009, 61/144,744, filed on Jan. 15, 2009, and 61/144,460, filed on Jan. 14, 2009, the contents of which are all incorporated by reference herein in their entirety.

TECHNICAL FIELD

The present invention relates to a signal transmission method using a multicast broadcast single frequency network (MBSFN) subframe in a radio communication system. More particularly, the present invention relates to a method of transmitting a backhaul signal between a base station and a relay station by using an MBSFN subframe and a method of reporting a usage of the MBSFN subframe to a user equipment.

BACKGROUND ART

Radio communication systems are widely spread all over the world to provide various types of communication services such as voice or data. In general, the radio communication system may be a multiple access system capable of supporting communication with multiple users by sharing available radio resources. Examples of the radio resource include a time resource, a frequency resource, a space resource, etc. Examples of the multiple access system include a time division multiple access (TDMA) system, a frequency division multiple access (FDMA) system, a spatial division multiple access (SDMA) system, etc. Time, frequency, and space resources are primary radio resources differently allocated to multiple users respectively to the TDMA system, the FDMA system, and the SDMA system.

In addition, the radio communication system is a system supporting bidirectional communication. The bidirectional communication can be performed by using a time division duplex (TDD) mode, a frequency division duplex (FDD) mode, etc. The TDD mode uses the time resource to identify uplink transmission and downlink transmission. The FDD mode uses the frequency resource to identify uplink transmission and downlink transmission.

The radio communication system includes a base station (BS) providing a service to a specific region (i.e., a cell). In general, a user equipment (UE) can communicate with the BS when the UE is located within a coverage of the BS. When the UE is located in a cell boundary or when an obstacle such as a building exists between the UE and the BS, communication quality between the UE and the BS may not be satisfactory.

Several methods are provided to extend the coverage of the BS. In one of the methods, the radio communication system employs a relay station (RS). For example, long term evolution (LTE)-advanced, which is a promising candidate technique of international mobile telecommunication (IMT)-advanced (i.e., a post $3^{rd}$ generation mobile communication system), includes an RS technique among primary techniques.

The RS is an apparatus for relaying a signal between the BS and the UE, and is used to extend cell coverage of the radio communication system and to improve cell throughput. An uplink and a downlink between the BS and the RS are backhaul links. An uplink and a downlink between the BS and the UE or between the RS and the UE are access links. Hereinafter, a signal transmitted through the backhaul link is referred to as a backhaul signal, and a signal transmitted through the access link is referred to as an access signal.

It is difficult for the RS to transmit and receive a signal by using the same frequency band and the same time. For example, it is difficult for the RS to transmit an access signal while receiving a backhaul signal. This is because the access signal transmitted by the RS and the backhaul signal received by the RS act as interference to each other, which may result in signal distortion. This is called self interference (SI). In order for the RS to solve the SI problem, a complex SI cancellation process is required, and transmission and reception signal processors need to be separated spatially. In reality, it is difficult for the RS to cancel the SI, and even if it is implemented, great expenses are required.

The RS needs to report to UEs connected to the RS a subframe in which the backhaul signal is received from the BS. This is to prevent the UEs from performing an unnecessary signal reception operation since the RS cannot transmit the access signal in the subframe due to the SI. As one method of reporting the subframe by the RS to the UE, there is a method of configuring a subframe for receiving a backhaul signal as a multicast broadcast single frequency network (MBSFN) subframe.

The RS may report to the UE that a corresponding subframe is an MBSFN subframe by using a control signal transmitted in a duration of a first specific OFDM symbol and then may receive a backhaul signal in a duration of the remaining OFDM symbols. Such a method can be referred to as a relay method based on the MBSFN subframe.

As described above, although the MBSFN subframe can be used for receiving the backhaul signal by the RS from the BS, the MBSFN subframe is used in principle for a multimedia broadcast multicast service (MBMS). However, a method of identifying a usage of the MBSFN subframe and reporting the usage to the UE has not been considered in the conventional technique.

In addition, when one BS transmits a backhaul signal to two or more RSs in the relay method based on the MBSFN subframe, a multiplexing method for improving usage efficiency of radio resources is not taken into account.

SUMMARY OF INVENTION

Technical Problem

The present invention provides a signal transmission method using a multicast broadcast single frequency network (MBSFN) subframe.

Technical Solution

According to an aspect of the present invention, a method of transmitting a backhaul signal in a radio communication system is provided. The method includes: selecting a plurality of relay stations for transmitting a plurality of backhaul signals, and transmitting the plurality of backhaul signals to the selected respective relay stations by using different radio resources, wherein each of the selected relay stations configures a subframe for receiving each of the plurality of backhaul signals as a multicast broadcast single frequency network (MBSFN) subframe.

Advantageous Effects

According to the present invention, a backhaul signal can be transmitted between a base station and a plurality of relay stations by effectively using radio resources. In addition, a user equipment can know a usage of a multicast broadcast single frequency network (MBSFN) subframe, and thus can perform only a necessary decoding operation based on the usage. Therefore, unnecessary power consumed in the user equipment can be reduced.

MODE FOR INVENTION

Wideband CDMA (WCDMA) can be implemented with a radio technique such as a universal terrestrial radio access network (UTRAN) defined by the $3^{rd}$ generation partnership project (3GPP) standardization organization. CDMA2000 is a radio technique based on code division multiple access (CDMA). High rate packet data (HRPD) defined by the $3^{rd}$ generation partnership project 2 (3GPP2) provides a high-rate packet data service in a CDMA2000-based system. Evolved HRPD is an evolution of the HRPD. Time division multiple access (TDMA) can be implemented with a wireless technique such as global system for mobile communications (GSM)/general packet radio service (GPRS)/enhanced data rates for GSM evolution (EDGE). Orthogonal frequency division multiple access (OFDMA) can be implemented with a wireless technique such as IEEE 802.11(Wi-Fi), IEEE 802.16 (WiMAX), IEEE 802.20, evolved-UTRAN (E-UTRAN), etc.

Long term evolution (LTE) is a part of an evolved-universal mobile telecommunications system (E-UMTS) using an evolved-universal terrestrial radio access network (E-UTRAN). The LTE employs the OFDMA in a downlink and employs single carrier-frequency division multiplex access (SC-FDMA) in an uplink. LTE-advanced (LTE-A) is an evolution of the LTE. For clarity, the following description will focus on the 3GPP LTE/LTE-A. However, technical features of the present invention are not limited thereto.

Figure 1:
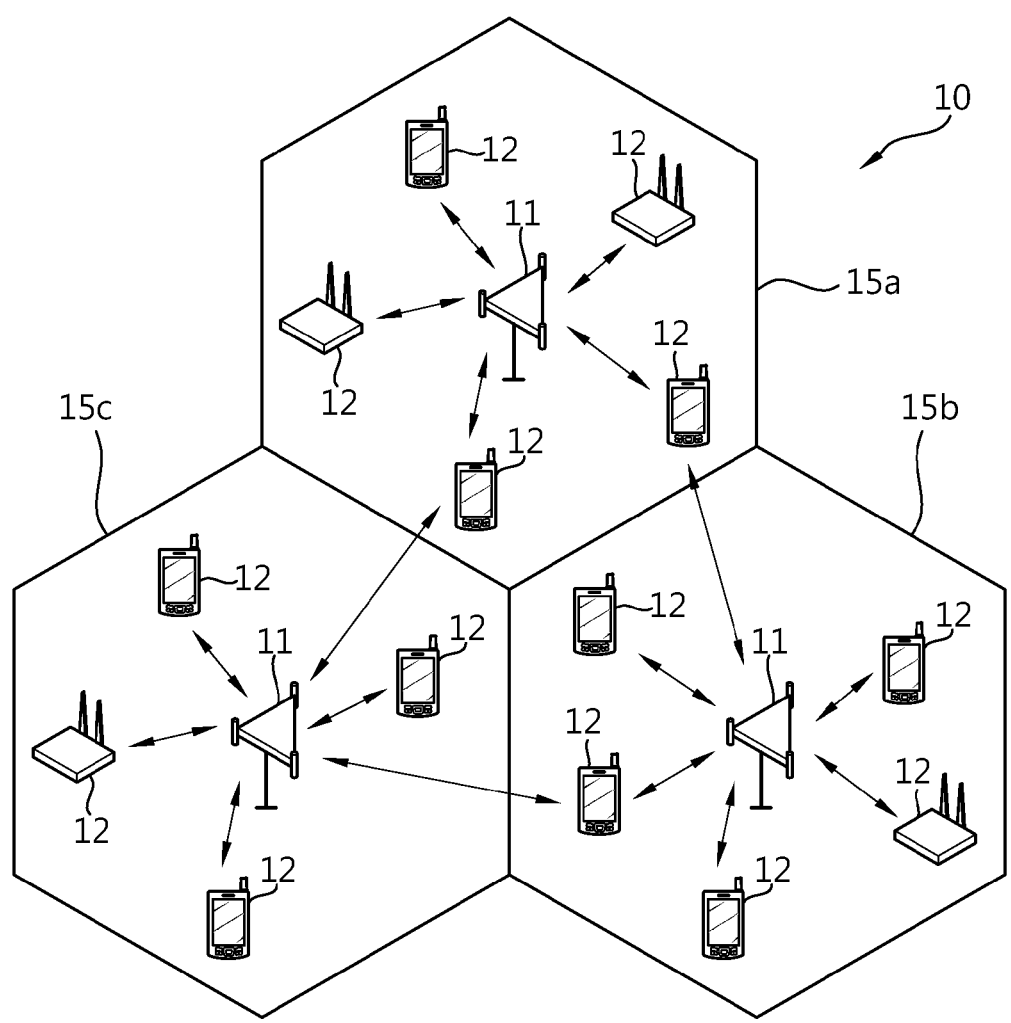
FIG. 1 shows a radio communication system.

FIG. 1 shows a radio communication system.

Referring to FIG. 1, a radio communication system 10 includes at least one base station (BS) 11. The BSs 11 provide communication services to specific geographical regions (generally referred to as cells) 15a, 15b, and 15c. The cell can be divided into a plurality of regions (referred to as sectors). One BS may include one or more cells. The BS 11 is generally a fixed station that communicates with a user equipment (UE) 12 and may be referred to as another terminology, such as an evolved node-B (eNB), a base transceiver system (BTS), an access point, an access network (AN), etc.

The UE 12 may be fixed or mobile, and may be referred to as another terminology, such as a mobile station (MS), a user terminal (UT), a subscriber station (SS), a wireless device, a personal digital assistant (PDA), a wireless modem, a handheld device, an access terminal (AT), etc.

Hereinafter, a downlink (DL) denotes a communication link from the BS to the UE, and an uplink (UL) denotes a communication link from the UE to the BS. In the DL, a transmitter may be a part of the BS, and a receiver may be a part of the UE. In the UL, the transmitter may be a part of the UE, and the receiver may be a part of the BS. In UL transmission, a source station may be the UE, and a destination station may be the BS. In DL transmission, the source station may be the BS, and the destination station may be the UE.

The radio communication system may include a relay station (RS). The RS may be a UE, or may be provided as a separate RS. The BS may perform functions such as connectivity, management, control, and resource allocation between the RS and the UE. The RS can be also referred to as other terms such as a relay node (RN).

Figure 2:
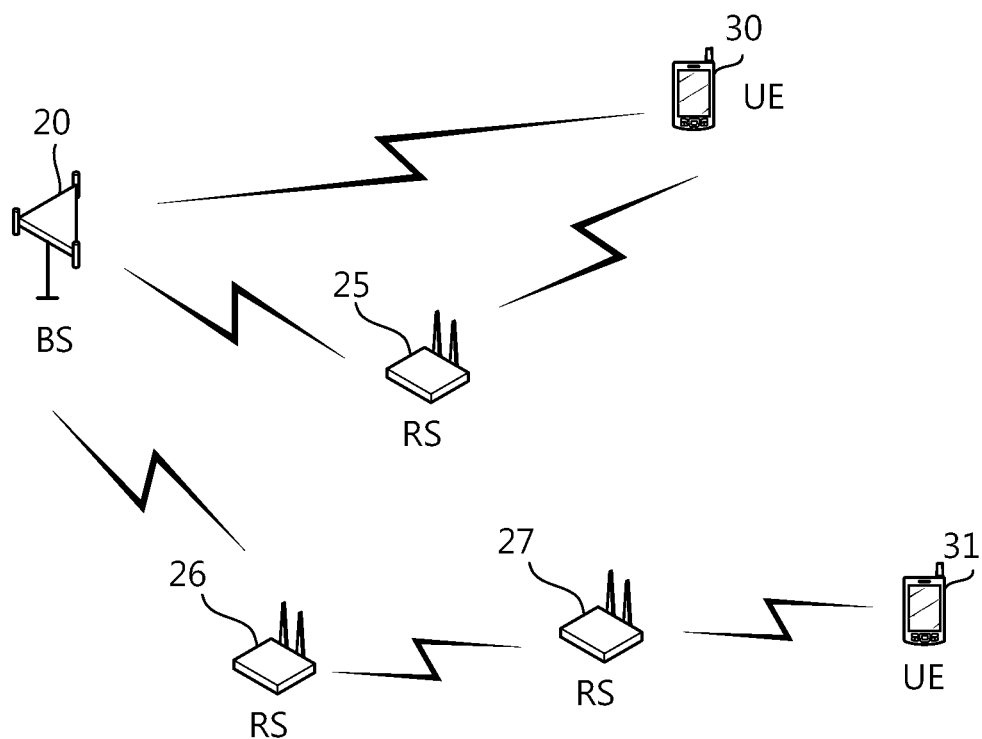
FIG. 2 shows a radio communication system employing a relay station.

FIG. 2 shows a radio communication system employing an RS.

Referring to FIG. 2, a BS 20 communicates with a UE 30 via an RS 25. In UL transmission, the UE 30 transmits UL data to the BS 20 and the RS 25, and the RS 25 retransmits the received UL data. In DL transmission, the BS 20 also communicates with a UE 31 via RSs 26 and 27. In DL transmission, the BS 20 transmits DL data to the RSs 26 and 27 and the UE 31, and the RSs 26 and 27 retransmit the received DL data either simultaneously or in sequence. Although it is shown that two RSs 26 and 27 are used in DL transmission, the present invention is not limited thereto, and thus one RS may be used. In addition, although one BS 20, three RSs 25, 26, and 27, and two UEs 30 and 31 are shown in FIG. 2, the present invention is not limited thereto. The number of BSs, RSs, and UEs included in the radio communication system is not limited to any particular number. A relay scheme used in the RS may be either amplify and forward (AF) or decode and forward (DF), and the technical features of the present invention are not limited thereto.

Even UEs located within the coverage of the BS can communicate with the BS via the RS in order to improve a transfer speed depending on a diversity effect. Hereinafter, a macro user equipment (MaUE) is a UE that directly communicates with the BS, and a relay user equipment (ReUE) is a UE that communicates with the RS. The MaUE and the ReUE will be collectively referred to as the UE unless otherwise specified.

Figure 3:
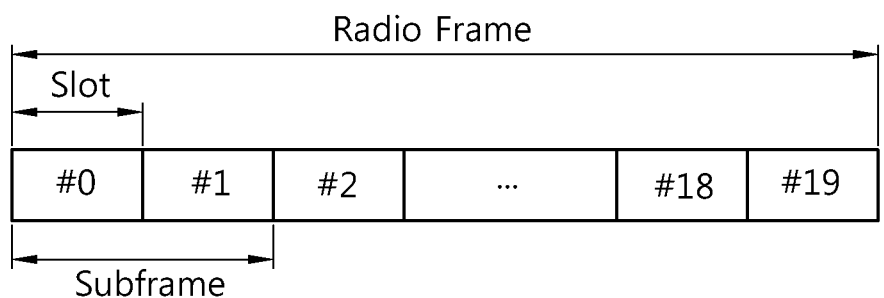
FIG. 3 shows a structure of a frequency division duplex (FDD) radio frame in $3^{rd}$ generation partnership project (3GPP) long term evolution (LTE).

FIG. 3 shows a structure of a frequency division duplex (FDD) radio frame in 3GPP LTE.

Referring to FIG. 3, a radio frame includes 10 subframes. One subframe includes two consecutive slots. A time required for transmitting one subframe is called a transmission time interval (TTI). For example, one subframe may have a length of 1 millisecond (ms), and one slot may have a length of 0.5 ms.

Figure 4:
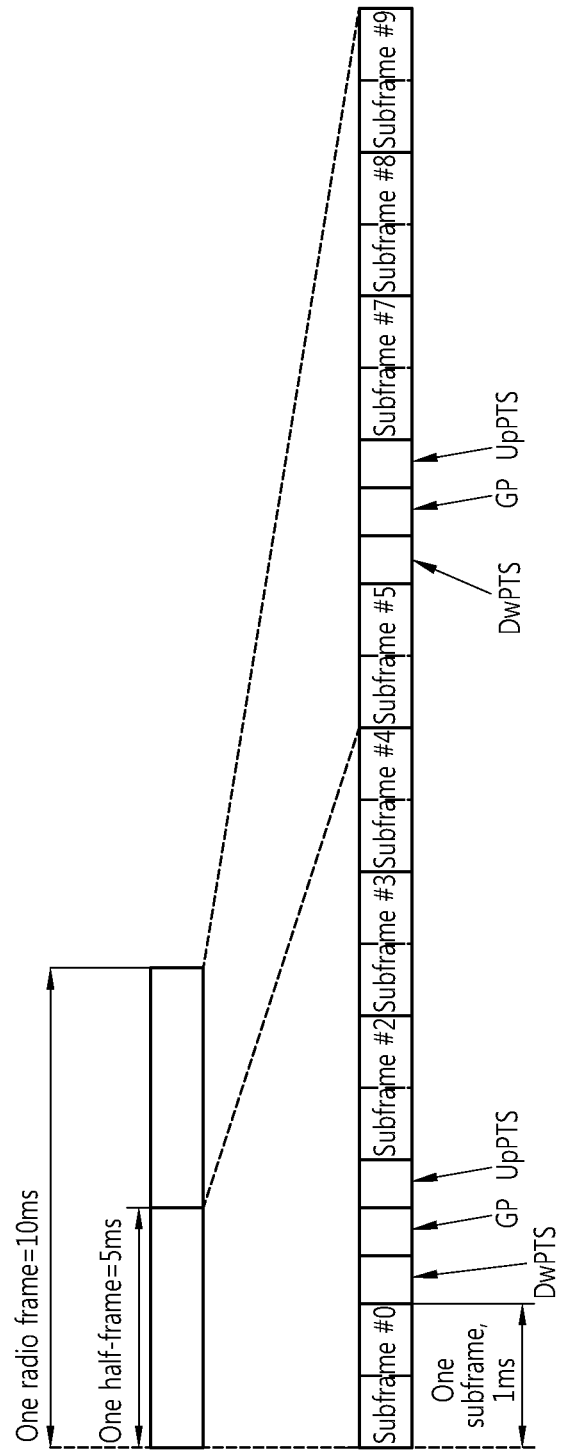
FIG. 4 shows a time division duplex (TDD) radio frame structure in 3GPP LTE.

FIG. 4 shows a time division duplex (TDD) radio frame structure in 3GPP LTE.

Referring to FIG. 4, one radio frame has a length of 10 ms, and consists of two half-frames each having a length of 5 ms. One half-frame consists of five subframes each having a length of 1 ms. Each subframe is designated as any one of a UL subframe, a DL subframe, and a special subframe. One radio frame includes at least one UL subframe and at least one DL subframe. One subframe consists of two consecutive slots. For example, one subframe may have a length of 1 ms, and one slot may have a length of 0.5 ms.

The special subframe is a specific period positioned between the UL subframe and the DL subframe for the purpose of UL-DL separation. One radio frame includes at least one special subframe. The special subframe includes a downlink pilot time slot (DwPTS), a guard period, and an uplink pilot time slot (UpPTS). The DwPTS is used for initial cell search, synchronization, or channel estimation. The UpPTS is used for channel estimation in a BS and UL transmission synchronization of a UE. The guard period is positioned between the UL time slot and the DL time slot and is used to remove interference that occurs in UL transmission due to a multi-path delay of a DL signal.

In FDD and TDD radio frames, one slot includes a plurality of orthogonal frequency division multiplexing (OFDM) symbols in a time domain and a plurality of resource blocks (RBs) in a frequency domain. Since 3GPP LTE uses OFDMA in DL transmission, the OFDM symbol is for expressing one symbol period, and thus can be referred to as other terms such as an SC-FDMA symbol according to the multiple access scheme. The RB is a resource allocation unit, and includes a plurality of consecutive subcarriers in one slot.

The sections 4.1 and 4.2 of 3GPP TS 36.211 V8.3.0 (2008-05) "Technical Specification Group Radio Access Network; Evolved Universal Terrestrial Radio Access (E-UTRA); Physical Channels and Modulation (Release 8)" can be incorporated herein by reference in order to explain the radio frame structure described with reference to FIG. 3 and FIG. 4.

The structure of the radio frame is for exemplary purposes only, and thus the number of subframes included in the radio frame or the number of slots included in the subframe, and the number of OFDM symbols included in the slot may change variously.

Figure 5:
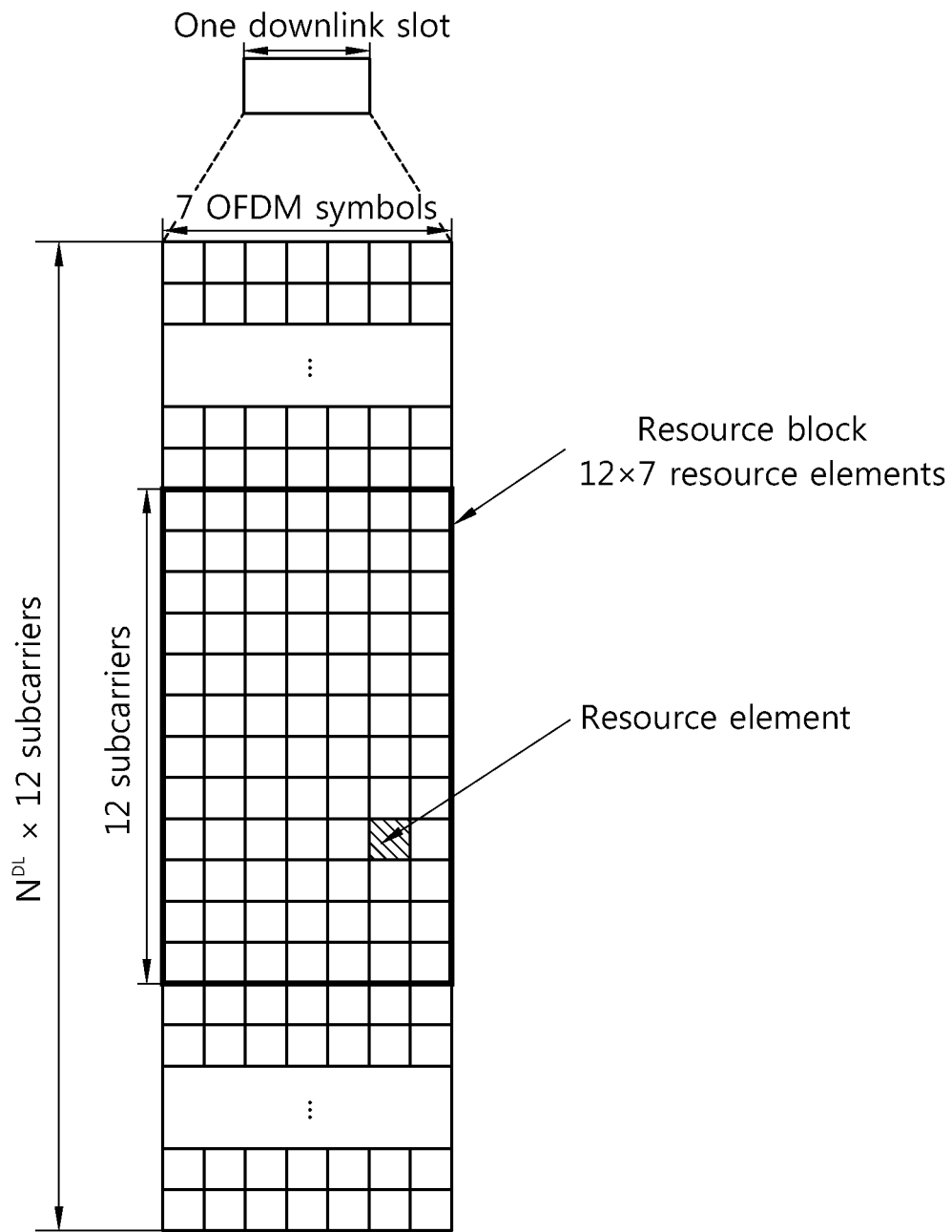
FIG. 5 shows an example of a resource grid for one downlink slot.

FIG. 5 shows an example of a resource grid for one DL slot.

Referring to FIG. 5, one DL slot includes a plurality of OFDM symbols in a time domain. It is described herein that one DL slot includes 7 OFDMA symbols and one resource block (RB) includes 12 subcarriers in a frequency domain for exemplary purposes only, and the present invention is not limited thereto.

Each element on the resource grid is referred to as a resource element, and one RB includes 12×7 resource elements. The number $N^{DL}$ of RBs included in the DL slot depends on a DL transmission bandwidth determined in a cell.

Figure 6:
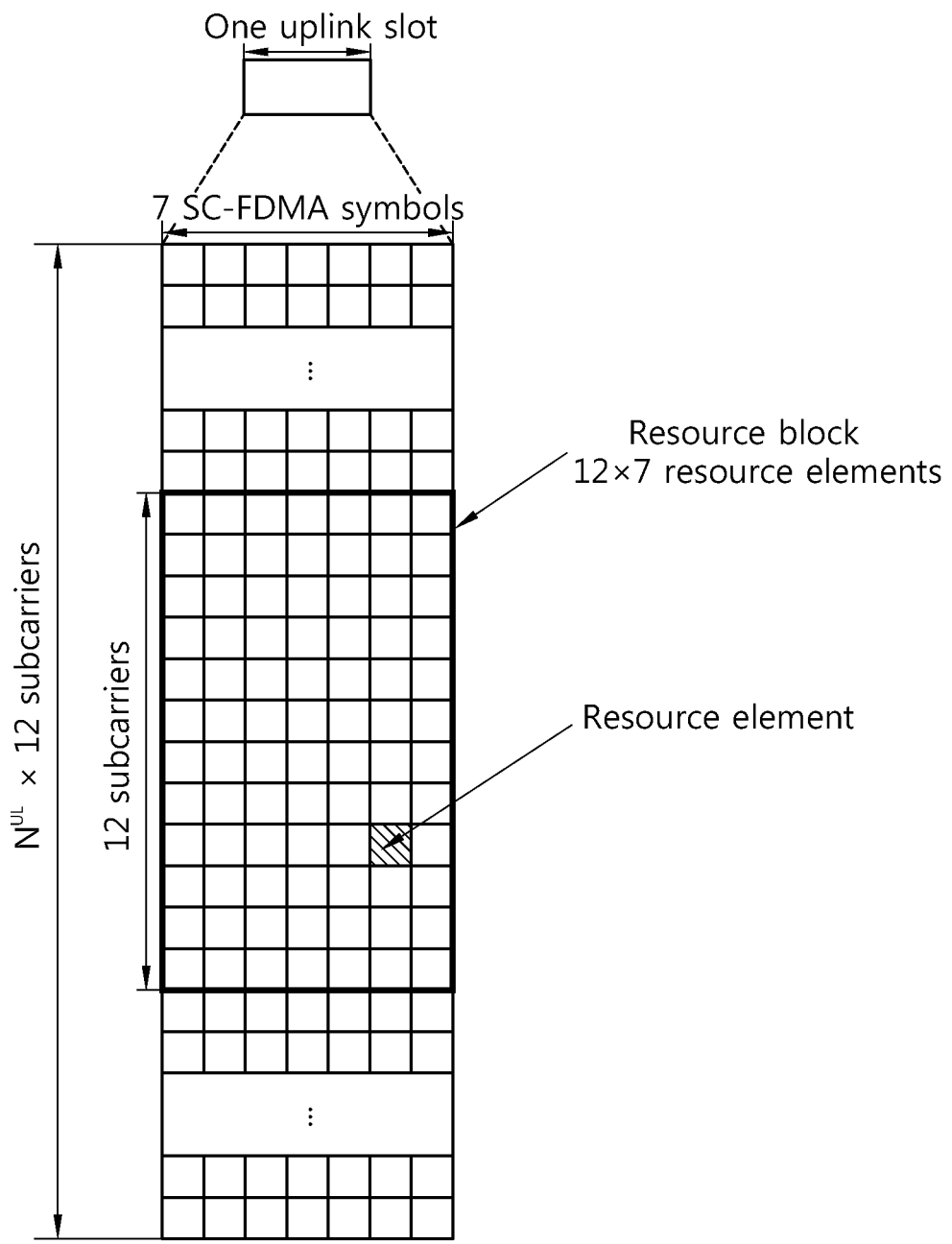
FIG. 6 shows an example of a resource grid for one uplink slot.

FIG. 6 shows an example of a resource grid for one UL slot.

Referring to FIG. 6, the UL slot includes a plurality of SC-FDMA symbols in a time domain, and includes a plurality of resource blocks (RBs) in a frequency domain. Although it is described herein that one UL slot includes 7 SC-FDMA symbols, and one resource block includes 12 subcarriers, the present invention is not limited thereto. The number $N^{UL}$ of resource blocks included in the UL slot depends on a UL transmission bandwidth defined in a cell.

An RS can configure a subframe for receiving a backhaul signal from a BS as an MBSFN subframe.

First, the MBSFN subframe will be described. The MBSFN subframe can be used for two usages. The first usage is for a multimedia broadcast multicast service (MBMS). The MBMS is a service for transmitting the same signal concurrently in several cells in a radio communication system. Therefore, a reference signal has to be inserted in a different manner from that of unicast transmission in which different data is transmitted in each cell. For this, a BS reports to a UE a position of a subframe in which an MBMS signal is transmitted, and a reference signal is inserted in a different manner from that of unicast transmission in the subframe. The UE can receive the MBMS signal in the MBSFN subframe for this usage. For convenience of explanation, the MBSFN subframe used for this usage is hereinafter referred to as a true (T)-MBSFN subframe.

The second usage is for preventing a UE connected to each of a BS or an RS from performing unnecessary signal reception operations and reference signal measurement. For example, there is a possibility of malfunctioning if the UE fails to receive any signal including a reference signal in the entire part of a specific subframe in 3GPP LTE. To prevent this, the RS configures a subframe for receiving a backhaul signal from the BS as an MBSFN subframe, and reports this to an ReUE. Then, the ReUE does not perform reference signal measurement in the MBSFN subframe for this usage. Although the BS or the RS configures this subframe as the MBSFN subframe, the subframe in which no MBMS signal is transmitted in practice is hereinafter referred to as a fake (F)-MBSFN subframe for convenience of explanation.

A method in which the BS or the RS identifies a usage of the MBSFN subframe and reports the usage to the UE has not been taken into account in the conventional technique.

Figure 7:
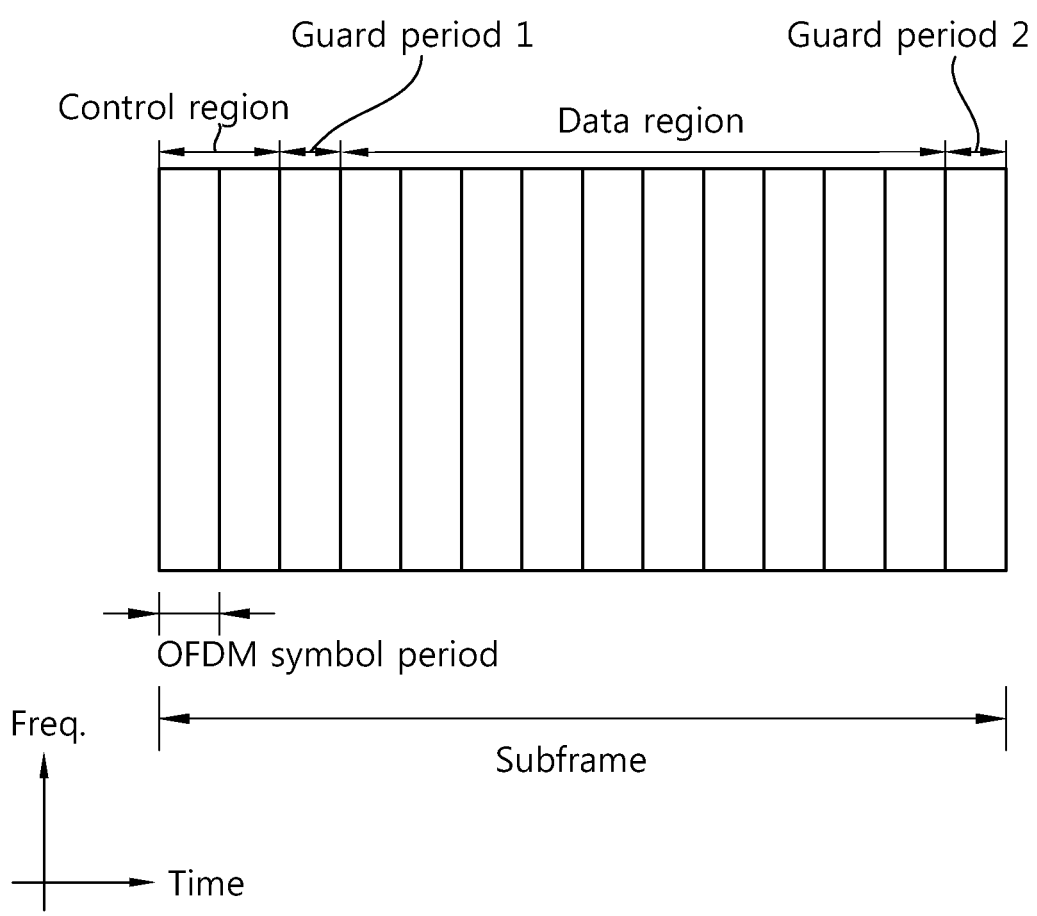
FIG. 7 shows an example of a structure of a multicast broadcast single frequency network (MBSFN) subframe.

FIG. 7 shows an example of a structure of an MBSFN subframe.

Referring to FIG. 7, the MBSFN subframe may include a control region, a guard period 1, a guard period 2, and a data region.

The control region is a region to which control channels are allocated in a specific number of OFDM symbol periods (e.g., 2 OFDM symbol periods). Examples of DL control channels used in 3GPP LTE include a physical control format indicator channel (PCFICH), a physical hybrid-ARQ indicator channel (PHICH), a physical downlink control channel (PDCCH), etc. The PCFICH carries information regarding the number of OFDM symbols (i.e., a size of the control region) used for transmission of control channels in the subframe. The PHICH carries an acknowledgement (ACK)/not-acknowledgement (NACK) signal for UL hybrid automatic repeat request (HARQ). That is, an ACK/NACK signal for UL data transmitted by the UE is transmitted on the PHICH.

Control information transmitted on the PDCCH is referred to as downlink control information (DCI). The DCI indicates UL resource allocation information, DL resource allocation information, and UL transmit power control commands for any UE group, etc. The PDCCH can carry a downlink shared channel (DL-SCH)'s resource allocation and transmission format, an uplink shared channel (UL-SCH)'s resource allocation information, paging information regarding a paging channel (PCH), system information regarding the DL-SCH, a resource allocation of a higher-layer control message such as a random access response transmitted on the PDSCH, an aggregation of transmit power control commands for individual UEs in any UE group, activation of a voice over Internet (VoIP), etc.

Each of the guard period 1 and the guard period 2 may include, for example, one OFDM symbol period, and is a period for cancelling interference between data transmission and data reception. The guard period 1 and the guard period 2 may change variously depending on a propagation delay between a BS and an RS.

The data region is located between the guard period 1 and the guard period 2. A physical downlink shared channel (PDSCH) can be allocated to the data region.

The BS or the RS can first report to a UE whether any subframe is the MBSFN subframe by using a higher layer signal. For example, the BS or the RS can transmit information indicating whether the subframe is the MBSFN subframe through a physical broadcast channel (PBCH) on which system information is transmitted. The PBCH can be transmitted in first four OFDM symbols of a $2^{nd}$ slot of a $1^{st}$ subframe. The information indicating whether the subframe is the MBSFN subframe may have a bitmap format. For example, if a specific subframe is the MBSFN subframe, the information may be set to 1, and if the specific subframe is not the MBSFN subframe, the information may be set to 0 (the other way around is also possible). By using the information indicating whether the subframe is the MBSFN subframe, the UE can know whether each subframe included in a radio frame is the MBSFN subframe or a normal subframe (i.e., a subframe other than the MBSFN subframe).

Regarding the subframe which is configured as the MBSFN subframe, the BS or the RS can report its usage by using the higher layer signal or the PDCCH. That is, if information indicating the usage of the MBSFN subframe is referred to as a usage indicator for convenience of explanation, the usage indicator can be transmitted by using the higher layer signal or the PDCCH.

First, a case where the usage indicator is transmitted by using the higher layer signal will be described. The BS or the RS can transmit the usage indicator by appending the usage indicator to the higher layer signal such as system information transmitted through the PDSCH (e.g., PBCH). In this case, the usage indicator may have a bitmap format.

For example, it is assumed that the BS or the RS configures a subframe repetitively with a period of P subframes, and M subframes are configured as MBSFN subframes in one period. In this case, the MBSFN subframes can be expressed by a subframe $kP+n_1$, a subframe $kP+n_2$, ..., and a subframe $kP+n_M$ (herein, k is an integer, and $n_1<n_2<...<n_m$, where $n_1$ to $n_M$ are integers). Then, the BS or the RS can transmit an M-bit bitmap (i.e., usage indicator) for indicating a usage of each of corresponding M subframes by using the higher layer signal. In the M-bit bitmap, '1' may indicate a T-MBSFN subframe, and '0' may indicate an F-MBSFN subframe (the other way around is also possible).

By receiving the usage indicator indicating such a usage, the UE can know whether each MBSFN subframe is the T-MBSFN subframe or the F-MBSFN subframe. For example, if the usage indicator received by the UE is '0010000100', it can be seen that a $3^{rd}$ MBSFN subframe and an $8^{th}$ MBSFN subframe among 10 MBSFN subframes are T-MBSFN subframes. Then, the UE may receive an MBMS signal in the $3^{rd}$ and $8^{th}$ MBSFN subframes, and may not perform reference signal measurement in the remaining MBSFN subframes.

Unlike this, a backhaul signal (to be finally delivered to the UE itself) can be received by the UE in advance in the F-MBSFN subframe in which a signal is transmitted from the BS to the RS, and thus can be utilized to decode the backhaul signal to be relayed from the RS to the UE.

If the UE is unable to receive or decode the usage indicator, all MBSFN subframes can be regarded as T-MBSFN subframes (or F-MBSFN subframes).

Hereinafter, a case where the usage indicator is transmitted through the PDCCH will be described.

The case where the usage indicator is transmitted through the PDCCH can be classified into two cases: 1) a case where it is transmitted through a PDCCH of the MBSFN subframe; and 2) a case where it is transmitted through a PDCCH of a subframe other than the MBSFN subframe.

First, the case 1) will be described. As described above, in the MBSFN subframe, the PDCCH can be transmitted on a specific number of OFDM symbols located in a first portion. A BS or an RS can transmit the PDCCH by appending the usage indicator to the PDCCH of the MBSFN subframe. In other words, by generating a new field indicating a usage of the MBSFN subframe in the PDCCH of the MBSFN subframe and by transmitting a value of the usage indicator in the new field, the usage of the MBSFN subframe can be reported to the UE. In this case, for example, if the usage indicator value is 1, it may indicate the T-MBSFN subframe, and if the usage indicator value is 0, it may indicate the F-MBSFN subframe. On the contrary, if the usage indicator value is 1, it may indicate the F-MBSFN subframe, and if the usage indicator value is 0, it may indicate the T-MBSFN subframe. When the UE is unable to receive the usage indicator or when the UE is unable to decode the usage indicator even if the usage indicator is received, a corresponding MBSFN subframe can be regarded as either the T-MBSFN subframe or the F-MBSFN subframe by definition.

As described above, in addition to a method in which the usage indicator of the MBSFN subframe is directly included in the PDCCH, a usage of the MBSFN subframe can be reported by masking a specific broadcast identifier to the PDCCH of the MBSFN subframe.

In general, the BS appends a cyclic redundancy check (CRC) for error detection to a PDCCH (specifically, DCI) to be sent to the UE. An identifier (referred to as a radio network temporary identifier (RNTI)) is masked to the CRC according to an owner or usage of the PDCCH. Examples of the identifier include a cell-RNTI (C-RNTI) which is a unique identifier of a specific UE, a paging-RNTI (P-RNTI) which is a paging identifier for a paging message transmitted through a paging channel (PCH), a system information-RNTI (SI-RNTI) which is a system information identifier for system information transmitted through a DL-SCH, etc.

The BS or the RS can perform transmission by masking a specific broadcast identifier such as a specific P-RNTI and a specific SI-RNTI among the aforementioned identifiers to only a PDCCH of the F-MBSFN subframe among MBSFN subframes (alternatively, only a PDCCH of the T-MBSFN subframe). Then, the UE can know a usage of the MBSFN subframe according to whether the PDCCH having the specific broadcast identifier is detected from the MBSFN subframe. That is, when the PDCCH having the specific identifier is detected from the MBSFN subframe, the UE can regard the MBSFN subframe as the F-MBSFN subframe. It is enough for the UE to perform an operation corresponding to the usage of the MBSFN subframe. For example, the UE may receive the MBMS signal in the T-MBSFN subframe, and may not measure a reference signal in the F-MBSFN subframe. Unlike this, in a case where the UE receives a backhaul signal and utilizes the backhauls signal to decode a signal transmitted by the RS, the UE may receive the backhaul signal in the F-MBSFN subframe.

The BS or the RS can perform transmission by using a broadcast identifier (e.g., SI-RNTI, P-RNTI) in the PDCCH of the MBSFN subframe including the usage indicator so that it can be received by all UEs.

Now, the case 2) where the usage indicator is transmitted through a PDCCH of a subframe other than an MBSFN subframe will be described.

The BS or the RS can transmit the usage indicator through the PDCCH of the subframe other than the MBSFN subframe. In this case, in order to allow all UEs to be able to receive the usage indicator, the usage indicator can be transmitted through a PDCCH transmitted in a subframe that cannot be configured as the MBSFN subframe (e.g., any one of subframes 0, 4, 5, and 9 in FDD, and any one of subframes 0, 1, 5, and 6 in TDD).

The usage indicator transmitted in one subframe can report a usage of one subsequent MBSFN subframe, and also can report a usage of two or more subsequent MBSFN subframes. If the number of subsequent MBSFN subframes is N, the usage indicator may have a bitmap format consisting of N bits. For example, if a 3-bit usage indicator (e.g., '101') is transmitted on a PDCCH of a subframe 0, each bit value of the usage indicator may indicate a usage of three MBSFN subframes subsequent to the subframe 0. If subframes 1, 2, and 3 are MBSFN subframes, the subframe 1 and 3 may indicate a T-MBSFN subframe, and the subframe 2 may indicate an F-MBSFN subframe. Alternatively, if the subframes 1 and 3 are MBSFN subframes, a 2-bit usage indicator can be transmitted.

If the UE is unable to receive the usage indicator, all MBSFN subframes can be regarded as T-MBSFN subframes or F-MBSFN subframes until a next usage indicator is received. Alternatively, the UE may operate under the assumption that the same content as the previously received usage indicator is received.

As described above, the usage indicator can be transmitted to the UE by using the higher layer signal or the PDCCH. The usage indicator may additionally include a detailed usage indicator which is information for reporting a detailed usage of the F-MBSFN subframe.

The detailed usage of the F-MBSFN subframe may be various, for example: a) a usage of receiving a backhaul signal by the RS from the BS; b) a usage of transmitting a positioning reference signal by the BS or the RS; c) a usage of transmitting a unicast signal depending on 3GPP release 9; and d) a usage of transmitting a unicast signal depending on 3GPP release 10, etc. The detailed usage indicator refers to information for reporting the detailed usage of the F-MBSFN subframe.

One of reasons of specifying the usage of the F-MBSFN subframe in a further detail as described above is that a reference signal transmitted in the F-MBSFN subframe depending on each detailed usage can vary. That is, in case of an F-MBSFN subframe used for receiving a backhaul signal by the RS from the BS, any signal including the reference signal may not be transmitted in a region other than a PDCCH region of the F-MBSFN subframe. In case of an F-MBSFN subframe used for transmitting a positioning reference signal by the BS or the RS, the positioning reference signal may be transmitted together with a cell-specific reference signal. In case of an F-MBSFN subframe used for transmitting a unicast signal based on 3GPP release 9, a cell-specific reference signal is transmitted also in a region other than a region for transmitting a PDCCH. In case of an F-MBSFN subframe used for transmitting a unicast signal based on 3GPP release 10, the cell-specific reference signal is transmitted only in the region for transmitting the PDCCH. That is, a detailed usage of the F-MBSFN subframe and a reference signal depending on the detailed usage are related to each other.

Therefore, the BS or the RS can perform transmission by appending a detailed usage indicator, which reports arrangement of the detailed usage of the F-MBSFN subframe and/or arrangement of the reference signal, to the usage indicator. The detailed usage indicator can also be given in a bitmap format. For example, if the detailed usage of the F-MBSFN subframe includes four cases as described above, i.e., the cases a) to d), then the bitmap can be configured such that 2 bits indicate one detailed usage. That is, '00' may indicate a usage of the case a), '01' may indicate a usage of the case b), '10' may indicate a usage of the case c), and '11' may indicate a usage of the case d). If there are $2^K$ types of detailed usages of the F-MBSFN subframe, the bitmap of the detailed usage indicator can be configured in such a manner that K bits indicate one detailed usage. The bitmap of the detailed usage indicator may be transmitted in combination with the bitmap of the usage indicator, or may be transmitted independently.

The UE can know whether an MBSFN subframe is an F-MBSFN subframe by using the usage indicator. When the UE knows that the MBSFN subframe is the F-MBSFN subframe, the UE can determine a detailed usage of the F-MBSFN subframe by using the detailed usage indicator and can decode a reference signal according to the determined detailed usage.

Figure 8:
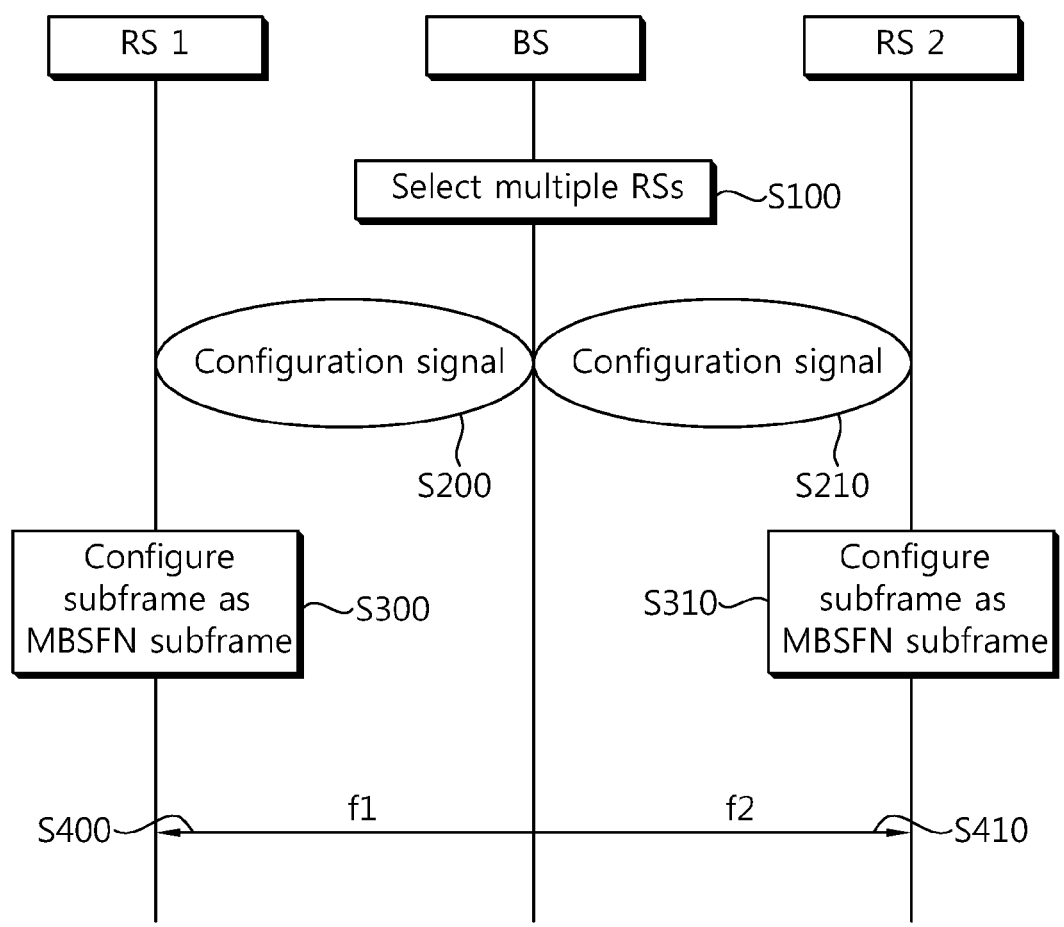
FIG. 8 is a flowchart showing a method of transmitting a backhaul signal according to an embodiment of the present invention.

FIG. 8 is a flowchart showing a method of transmitting a backhaul signal according to an embodiment of the present invention.

Referring to FIG. 8, a BS selects some RSs for transmitting the backhaul signal among a plurality of RSs (step S100). For example, the BS may select an RS 1 and an RS 2 among the plurality of RSs. The BS exchanges configuration signals for backhaul signal transmission with the selected RS 1 and RS 2 (step S200 and step S210). The configuration signal may include information on a radio resource allocated for backhaul signal transmission and a usage indicator indicating a usage of a subframe in which the backhaul signal is transmitted (herein, a detailed usage indicator may also be included). The information on the radio resource may include a variety of information such as a frequency band at which the backhaul signal is transmitted, a position of a subframe allocated for backhaul signal transmission within each frequency band, a subframe offset value, a code, etc. The subframe offset value will be described below. The usage indicator may be transmitted through a PDCCH as described above, or may be transmitted by using a higher layer signal not only to an RS but also to a MaUE and an ReUE. The usage indicator may indicate an F-MBSFN subframe, and the detailed usage indicator may indicate, for example, the usage of case a) above.

The RS 1 and the RS 2 configure a subframe in which the backhaul signal is received as an MBSFN subframe (step S300 and step S310).

The BS transmits the backhaul signal to each of the two or more selected RSs by allocating different radio resources. Herein, the radio resource may be any one of, for example, a frequency resource, a time resource, an antenna resource (for utilizing a different spatial resource), and a code resource. For example, the BS transmits the backhaul signal by using different frequency bands f1 and f2 to the RS 1 and the RS 2 (step S400 and step S410).

Figure 9:
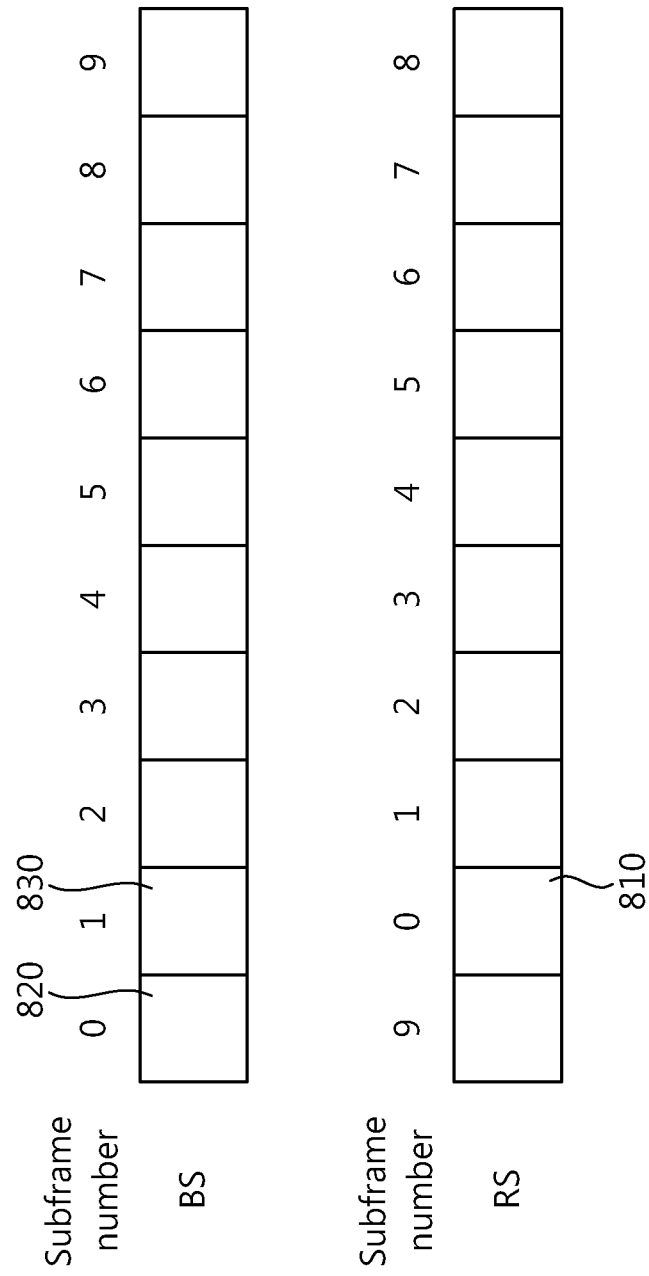
FIG. 9 shows a case where a subframe offset value of a relay station is 1.

FIG. 9 shows a case where a subframe offset value of an RS is 1.

Referring to FIG. 9, the subframe offset value denotes a start point of a radio frame. The subframe offset value implies a point at which a subframe 0 810 of a radio frame of the RS is located with respect to a position of a subframe 0 820 of a radio frame of a BS. The subframe 0 810 of the RS is spaced apart by one subframe from the subframe 0 820 of the BS and thus is located at a point where the subframe 1 830 of the BS is located. Therefore, the subframe offset value of the RS can be given to 1.

Hereinafter, a process of transmitting a backhaul signal by a BS to each of a plurality of RSs by using different radio resources will be described in detail. First, a case where the backhaul signal is transmitted by the BS to a plurality of selected RSs by using different frequency bands, that is, a frequency division multiplexing (FDM) scheme, will be described. The BS can transmit the backhaul signal to two or more RSs by allocating different frequencies within the same subframe.

Figure 10:
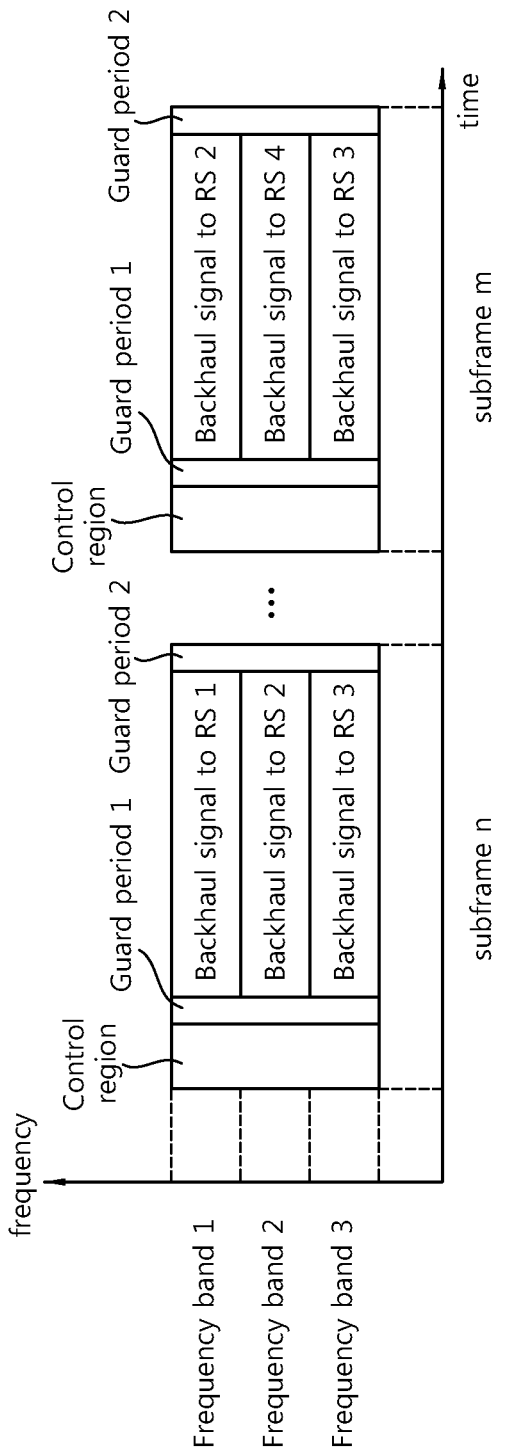
FIG. 10 shows frequency band allocation in each subframe when using a frequency division multiplexing (FDM) scheme.

FIG. 10 shows frequency band allocation in each subframe when using an FDM scheme.

Referring to FIG. 10, a BS transmits a backhaul signal to an RS 1, an RS 2, and an RS 3 in a subframe n. In this case, a frequency band 1 may be allocated to the RS 1, a frequency band 2 may be allocated to an RS 2, and a frequency band 3 may be allocated to an RS 3. In addition, the BS transmits a backhaul signal to the RS 2, the RS 3, and an RS 4 in a subframe m. In this case, the frequency band 1 may be allocated to the RS 2, the frequency band 3 may be allocated to the RS 3, and the frequency band 2 may be allocated to the RS 4. That is, the BS transmits the backhaul signal by allocating different frequency bands to respective subframes with respect to some or all of a plurality of RSs connected to the BS. In this case, the BS may transmit the backhaul signal to different RSs in each frame, and an allocated frequency band may also change variously.

The aforementioned FDM scheme has an advantage in that frequency selectivity can be well utilized. Since a channel state of a channel between the BS and the RS changes slowly in general, a backhaul signal is preferably transmitted by allocating a frequency band having a good channel state to each RS. The BS can allocate the frequency band having a good channel state to each RS by using channel quality information which is fed back by each RS. If the RS is unable to feed back the channel state information or if it is ineffective to feed back the channel state information, then the BS can disperse the frequency band allocated to each RS to the maximum extent possible. In this case, frequency diversity can be improved.

When the BS transmits the backhaul signal to the plurality of RSs by using the FDM, if RSs are arbitrarily selected, there may be a case where the backhaul signal cannot be received from some or all of the selected RSs.

Figure 11:
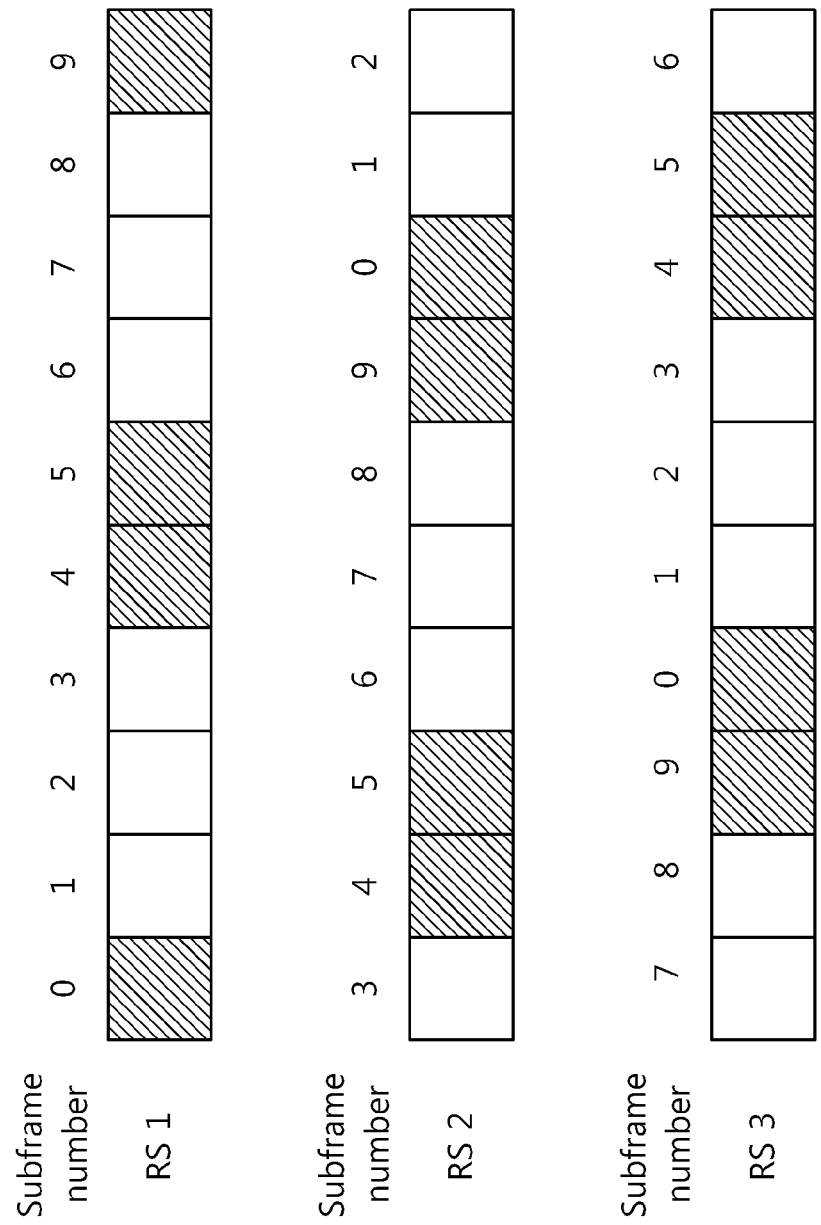
FIG. 11 shows an example in which a backhaul signal can be transmitted only for some relay stations among a plurality of relay stations.

FIG. 11 shows an example in which a backhaul signal can be transmitted only for some RSs among a plurality of RSs.

Referring to FIG. 11, an RS cannot receive a signal from a BS in subframes 0, 4, 5, and 9 (i.e., subframes indicated by a hatched box in FIG. 11), for example, in a 3GPP LTE system. This is because the RS has to transmit to a UE an essential signal such as a primary synchronization signal (PSS), a secondary synchronization signal (SSS), and a paging message. If each RS has a different subframe offset value as shown in FIG. 11, there may be a case where at least one subframe of each RS corresponds to the subframes 0, 4, 5, and 9 and thus the FDM cannot be used.

In order to solve such a problem, if the FDM scheme is used, in the backhaul signal transmission method according to the present embodiment, the step of selecting a plurality of RSs by the BS may further include a step of dividing RSs in a cell into a plurality of groups and a step of selecting a group including some RSs for transmitting a backhaul signal from the plurality of groups. In this case, the plurality of RSs included in one group may be RSs to which the same subframe offset value is set.

Figure 12:
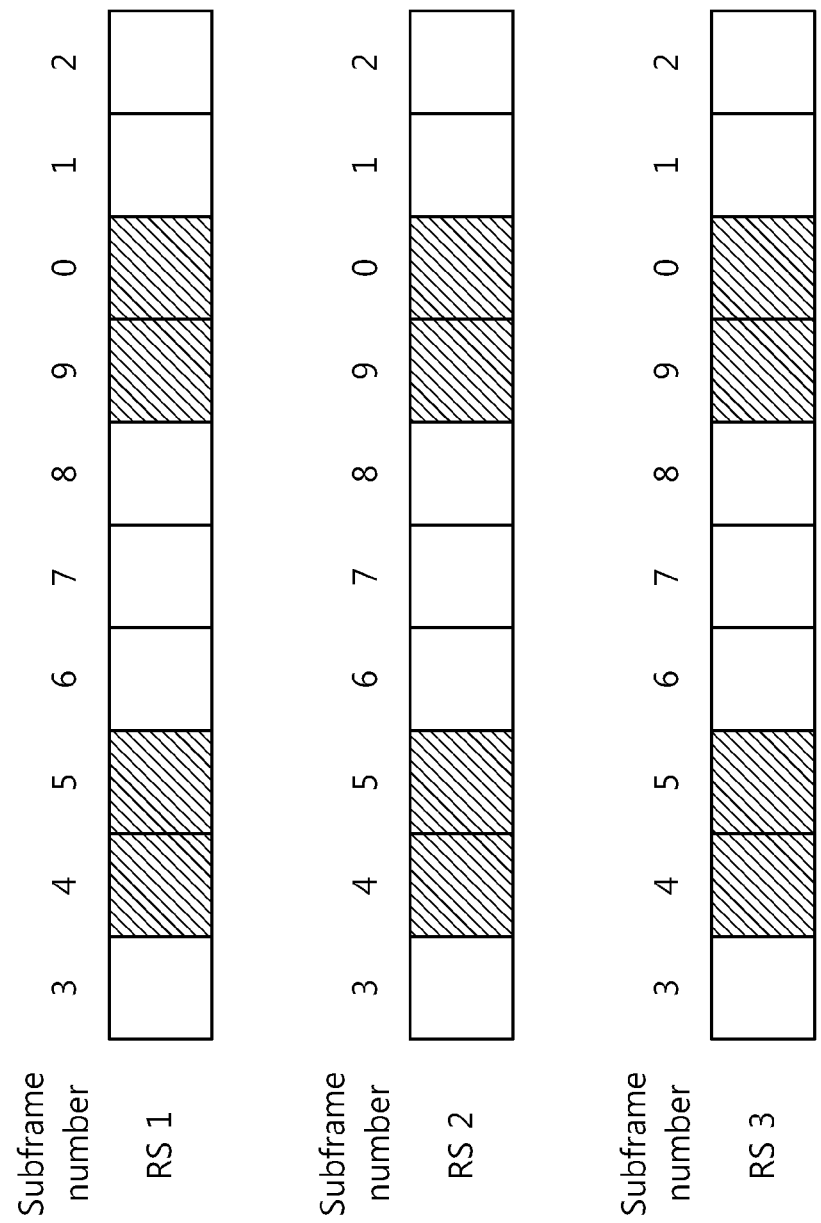
FIG. 12 shows an example in which relay stations 1 to 3 which are grouped by a base station have the same subframe offset value.

FIG. 12 shows an example in which RSs 1 to 3 which are grouped by a BS have the same subframe offset value.

Referring to FIG. 12, when the RSs 1, 2, and 3 are grouped into one group by the BS, the RSs 1 to 3 included in the group have the same subframe offset value (e.g., 3). Then, the BS can transmit a backhaul signal to all of the three RSs by using FDM in subframes 3, 6, 7, 8, 1, and 2 of each RS. However, the BS cannot transmit the backhaul signal in subframes 0, 4, 5, and 9 of each RS belonging to this group.

When an RS group created by the BS is formed in a plural number, each RS group may be configured to have a different subframe offset value. If all RS groups have the same subframe offset value, a subframe in which no RS can receive the backhaul signal is present as described above. Since the BS does not configure the subframe as an MBSFN subframe when transmitting the backhaul signal, the backhaul signal can be transmitted in all subframes in principle. However, if the RS is unable to receive the backhaul signal, it causes waste of radio resources. To prevent this, a plurality of RS groups are configured to have different subframe offset values. Then, even if the backhaul signal cannot be transmitted to any one of RS groups, the backhaul signal can be transmitted to another RS group, and thus a radio resource can be effectively used.

However, if the BS transmits the backhaul signal in its subframes 0, 4, 5, and 9, the backhaul signal is transmitted in a region other than a control region for transmitting a shared channel (SCH), a broadcast channel (BCH), a paging message, or the like of the BS.

Now, a case where a BS transmits a backhaul signal to two or more RSs by using different antennas (i.e., spatial resources), that is, a spatial division multiplexing (SDM) scheme, will be described. The BS transmits the backhaul signal to a plurality of RSs by allocating the same frequency band within the same subframe while using different antennas. When the backhaul signal is transmitted through different antennas, the backhaul signal can be transmitted by being processed with beamforming or a pre-coding matrix.

Figure 13:
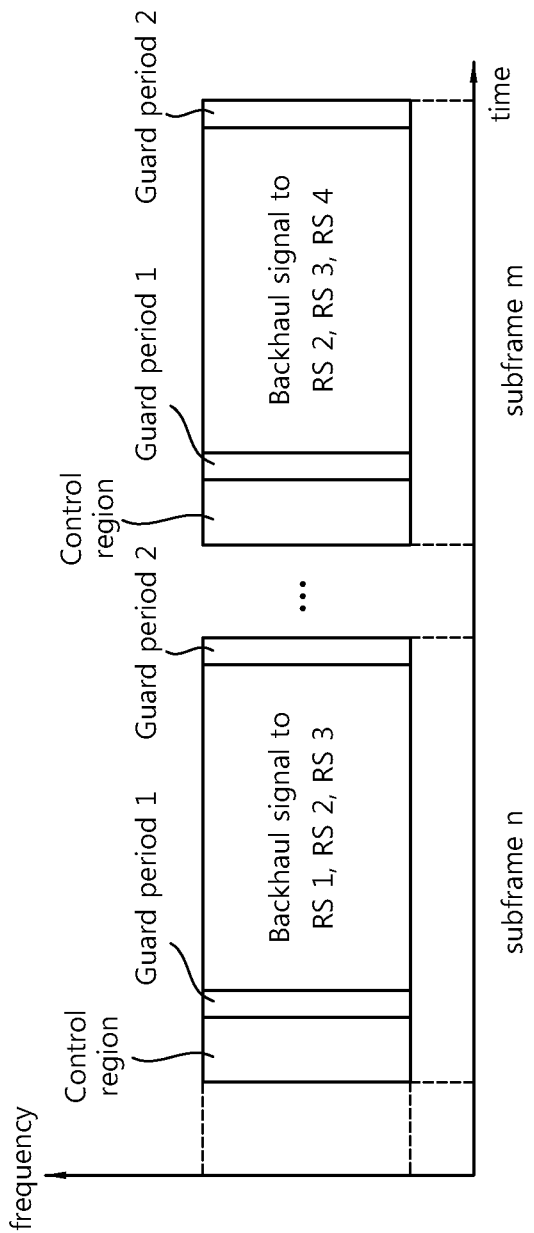
FIG. 13 shows resource allocation of each subframe when using a spatial division multiplexing (SDM) scheme.

FIG. 13 shows resource allocation of each subframe when using an SDM scheme.

Referring to FIG. 13, a BS transmits backhaul signals to an RS 1, an RS 2, and an RS 3 in a subframe n while using all frequency bands of the subframe n. That is, the backhaul signals transmitted to different RSs overlap in allocation of time and frequency resources, and use different spatial resources. The BS transmits backhaul signals to the RS 2, the RS 3, and an RS 4 in a subframe m. Spatial resources can be used by the use of a multi-antenna transmission and reception method. Although it is shown in FIG. 13 that the backhaul signals transmitted to different RSs fully overlap in terms of time and frequency resources, this is for exemplary purposes only, and thus the present invention is also applicable to a case where the backhaul signals partially overlap.

The SDM scheme is effective when a channel between a BS and an RS have a low rank. If the channel between the BS and the RS has a low rank, multi-stream transmission from the BS to one RS by using multiple antennas becomes difficult. Therefore, utilization of a radio resource can be increased when the backhaul signals are concurrently transmitted to different RSs by using the multi-antenna transmission method.

The SDM scheme is similar to the FDM in a sense that a backhaul signal is transmitted to a plurality of RSs in one subframe. Therefore, configuring of a subframe offset value, grouping of RSs, or the like described in the FDM scheme can also be applied to the SDM.

Next, a case where a BS transmits a backhaul signal to two or more RSs by using different time resources, that is, a time division multiplexing (TDM) scheme, will be described. The BS can transmit the backhaul signal to a plurality of RSs by allocating the same frequency band in different subframes.

Figure 14:
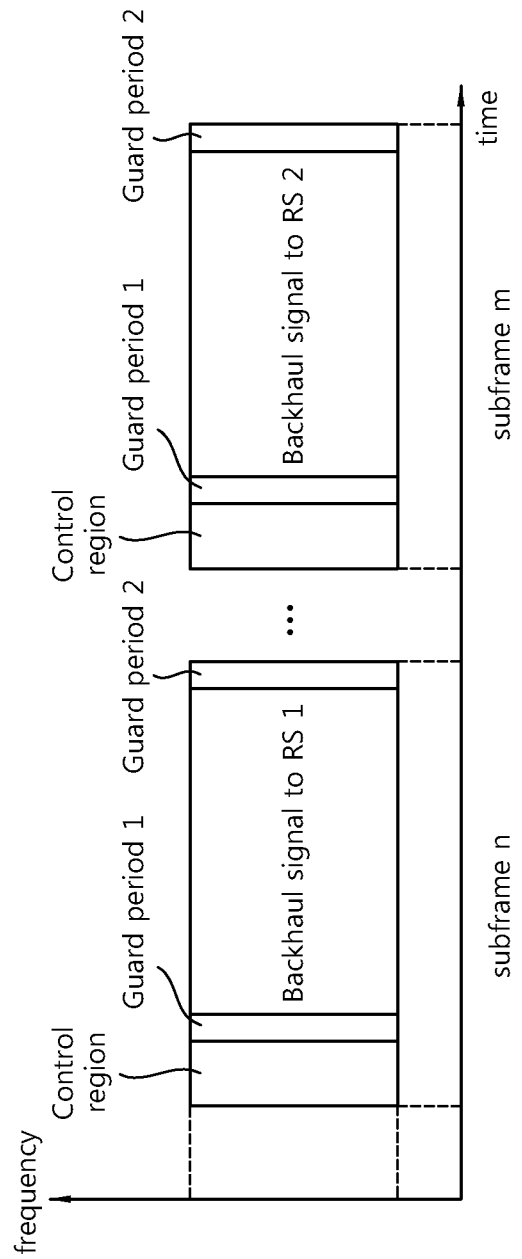
FIG. 14 shows radio resource allocation when a backhaul signal is transmitted by using a time division multiplexing (TDM) scheme.

FIG. 14 shows radio resource allocation when a backhaul signal is transmitted by using a TDM scheme.

Referring to FIG. 14, a BS transmits a backhaul signal to an RS 1 by using all available frequency bands in a subframe n. Then, the BS transmits a backhaul signal to an RS 2 by using all available frequency bands in a subframe m (herein, n and m are integers, where n<m). That is, the BS transmits the backhaul signal transmitted to each of two or more RSs in different subframes by using all frequency bands of the subframes. In other words, the backhaul signal can be transmitted to one RS in one subframe while using all radio resources, for example, all frequency bands. However, if there is no need to allocate all radio resources of a subframe when the backhaul signal is transmitted to a corresponding RS, a resource of the subframe can be shared with a UE directly connected to the BS or with a third RS. In this case, a signal transmitted to the UE directly connected to the BS or transmitted to the third RS can be identified by using FDM or SDM.

When the backhaul signal is transmitted by using the TDM scheme, the BS can set a different subframe offset value of each RS. For example, referring to FIG. 11, since the RSs 1, 2, and 3 have different subframe offset values, the BS can transmit the backhaul signal to any one of the RSs 1, 2, and 3. In this sense, the TDM scheme has an advantage in overall radio resource utilization of a radio communication system in comparison with the FDM/SDM scheme.

Figure 15:
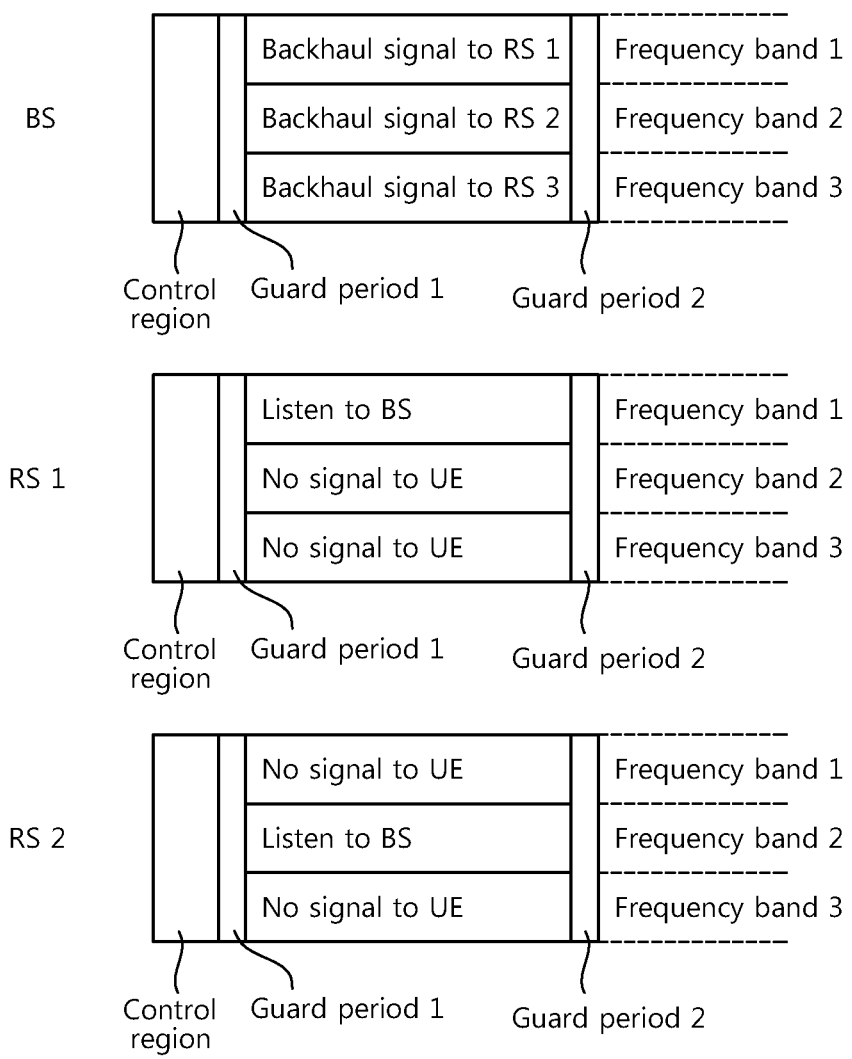
FIG. 15 shows an example in which a radio resource is wasted when a backhaul signal is transmitted to a plurality of relay stations by using an FDM scheme.

FIG. 15 shows an example in which a radio resource is wasted when a backhaul signal is transmitted to a plurality of RSs by using an FDM scheme.

Referring to FIG. 15, a BS transmits backhaul signals to RSs 1, 2, and 3 by using frequency bands 1, 2, and 3, respectively, in a subframe n. The backhaul signal transmitted at the frequency band 1 is information effective to the RS 1. However, the RS 1 receives the backhaul signal transmitted to other RSs even at the frequency bands 2 and 3. Therefore, the RS 1 cannot transmit an access signal to an ReUE at the frequency bands 2 and 3 due to self interference. Likewise, the RS 2 cannot transmit the access signal at the frequency bands 1 and 3. As a result, a radio resource is wasted as a whole in a radio communication system.

When using the TDM scheme, a smaller number of MBSFN subframes allocated to the backhaul link can be set by the RS in comparison with the FDM/SDM, and the RS can allocate more subframes to the access link. That is, in this method, more frequency and spatial resources are used while using less time resources, and thus the aforementioned waste of radio resources can be prevented.

When the backhaul signal is transmitted by the BS to a plurality of RS according to the FDM or SDM scheme, the RS can improve reception quality of the backhaul signal of the radio communication system by retransmitting a backhaul signal to be transmitted to another RS after receiving the backhaul signal in addition to the backhaul signal to be transmitted to the RS.

Figure 16:
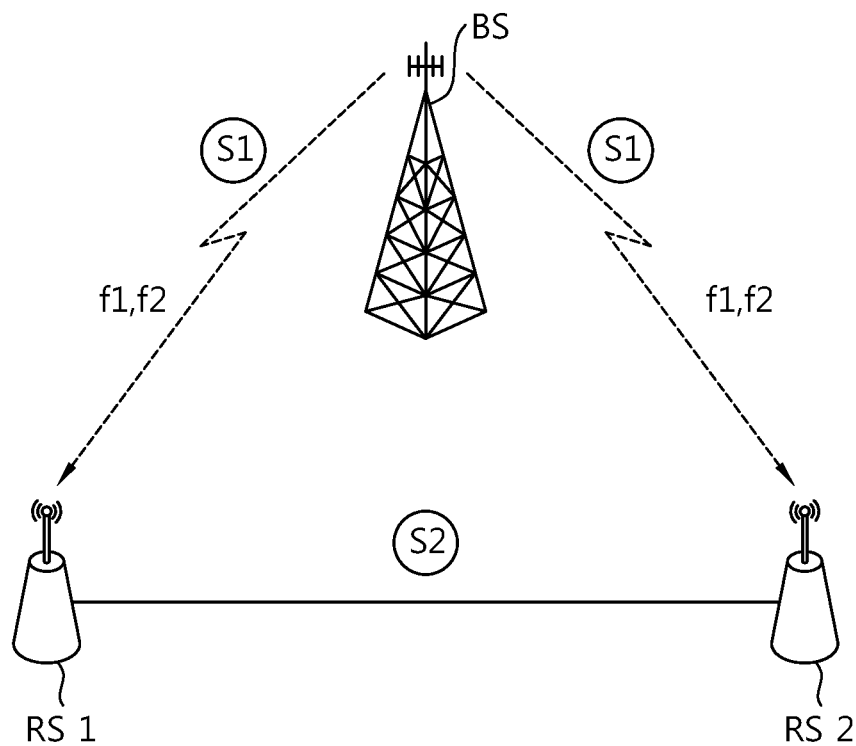
FIG. 16 shows a radio communication system for performing cooperative retransmission among a plurality of relay stations.

FIG. 16 shows a radio communication system for performing cooperative retransmission among a plurality of RSs.

Referring to FIG. 16, a wireless link can be established between a BS and an RS 1 or between the BS and an RS 2. A wired link or a wireless link can be established between the RS 1 and the RS 2. The BS can transmit a backhaul signal to the RS 1 and the RS 2 by using different frequency bands f1 and f2 in the same subframe (step S1). If a backhaul signal transmitted to the RS 1 is denoted by a backhaul signal 1 and a backhaul signal transmitted to the RS 2 is denoted by a backhaul signal 2, for example, the RS 1 receives not only the backhaul signal 1 but also the backhaul signal 2. The RS 1 can deliver the backhaul signal 2 to the RS 2 either directly or after performing decoding (step S2). This method is effective in particular when the RS 1 and the RS 2 are connected in a wired fashion. The RS 2 can increase reliability of the backhaul link and improve reception quality of the backhaul signal by receiving the backhaul signal 2 from at least one of the BS or the RS 1.

Alternatively, after receiving both the backhaul signals 1 and 2, the RS 1 can transmit the backhaul signal 2 together when the RS 2 relays the backhaul signal 2 to a UE 2 connected to the RS 2. In this method, signal reception quality of a UE located particularly at an edge portion of the coverage of the RS 1 and the RS 2 can be improved.

Alternatively, when an error occurs in a process of relaying the backhaul signal 2 by the RS 2 to the UE 2 connected to the RS 2 and thus retransmission is required, the RS 1 can retransmit the backhaul signal 2. In this method, diversity effect can be obtained by using cooperative retransmission among the plurality of RSs.

Alternatively, when the RS 2 fails to receive the backhaul signal 2 and thus the BS has to retransmit the backhaul signal 2, the RS 1 can retransmit the backhaul signal 2 on behalf of the BS or in cooperation with the BS.

When the RS has two or more sectors, the RS can configure a subframe for each sector. When the backhaul signal is received from one sector, the RS configures a subframe as an MBSFN subframe in that sector, and also configures a subframe as an MBSFN subframe in another sector. This is because strong interference may occur in a sector in which the backhaul signal is received when a signal is transmitted in another sector.

That is, the subframe is configured as the MBSFN subframe even in a sector in which the backhaul signal is not received, and an access signal cannot be transmitted to a UE connected to the RS. In a case where the backhaul signal is received in any one sector in an RS having two or more sectors in order to prevent waste of radio resources, it is preferable to receive the backhaul signal from other BSs in the remaining sectors.

Figure 17:
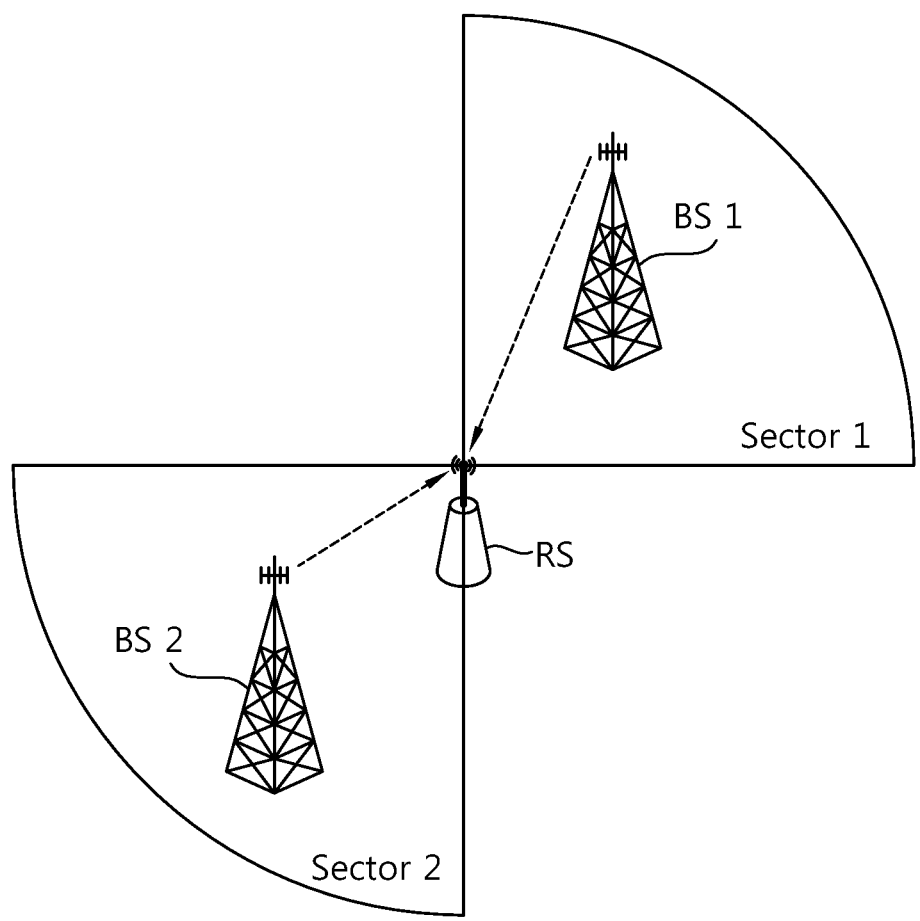
FIG. 17 shows a relay station for establishing a backhaul link with a different base station in a different sector.

FIG. 17 shows an RS for establishing a backhaul link with a different BS in a different sector.

Referring to FIG. 17, when the RS receives a backhaul signal from a BS1 in a sector 1, the RS receives a backhaul signal also from a BS 2 located in a sector 2. That is, when the RS receives a backhaul signal in one sector, a subframe for at least two or more sectors is configured as an MBSFN subframe, and the backhaul signal is received from at least two or more BSs.

Figure 18:
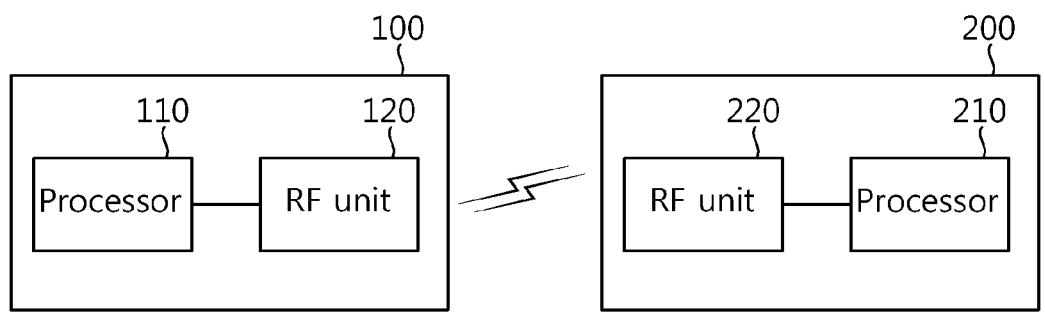
FIG. 18 is a block diagram showing a base station according to an embodiment of the present invention.

FIG. 18 is a block diagram showing a BS according to an embodiment of the present invention.

Referring to FIG. 18, a BS 100 includes a processor 110 and a radio frequency (RF) unit 120. The RF unit 120 transmits and receives a radio signal. The processor 110 is coupled to the RF unit 120. When communicating with an RS, the processor 110 selects a plurality of RSs for transmitting a backhaul signal, and allocates different radio resources to transmit the backhaul signal to each of the selected RSs. When communicating with a UE, the processor 110 transmits information indicating a usage of an MBSFN subframe to the UE. Although a structure of the BS is exemplified therein, the same is also applicable to the RS.

A UE 200 includes a processor 210 and an RF unit 220. The RF unit 220 transmits and receives a radio signal. The processor 210 is coupled to the RF unit 220. The processor 210 receives a usage indicator from the BS or the RS to determine whether a subframe is a T-MBSFN subframe or an F-MBSFN subframe, and receives a detailed usage indicator to determine a detailed usage of the F-MBSFN subframe. In addition, the processor 210 performs a decoding process corresponding to the detailed usage.

The present invention can be implemented with hardware, software, or combination thereof. In hardware implementation, the present invention can be implemented with one of an application specific integrated circuit (ASIC), a digital signal processor (DSP), a programmable logic device (PLD), a field programmable gate array (FPGA), a processor, a controller, a microprocessor, other electronic units, and combination thereof, which are designed to perform the aforementioned functions. In software implementation, the present invention can be implemented with a module for performing the aforementioned functions. Software is storable in a memory unit and executed by the processor. Various means widely known to those skilled in the art can be used as the memory unit or the processor.

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

The invention claimed is:

1. A method of communicating by a base station (BS) via a BS frame in a wireless communication system, the BS frame being a wireless frame that comprises plural subframes, the wireless communication system including the BS, a user equipment (UE) and a relay station (RS), the method comprising:

configuring, by the BS based on both a timing applied to the BS frame and a timing applied to a RS frame, at least one subframe of the BS frame, the at least one subframe for transmitting a signal to the RS by the BS; and transmitting the signal by the BS to the RS in the at least one subframe of the BS frame, wherein a subframe of the RS frame corresponding to the at least one subframe of the BS frame is configured as a Multicast Broadcast Single Frequency Network (MBSFN) subframe by the RS, wherein the configuring comprises configuring the at least one subframe per a fixed number of subframes periodically according to the timing applied to the BS frame with an exception of any subframes of the BS frame that are not configurable as an MBSFN subframe according to the timing applied to the RS frame, and wherein subframes of the RS frame that are not configurable as a MBSFN subframe according to the timing applied to the RS frame are fixed.

2. The method of claim 1, wherein a frequency band at which the BS transmits a signal to the RS is identical to a frequency band at which the RS transmits a signal to a user equipment connected to the-RS.

3. The method of claim 1, further comprising:

transmitting a configuration signal indicating the at least one subframe to the RS by using a higher layer signal.

4. The method of claim 1, wherein the subframes that are not configurable as a MBSFN subframe according to the timing applied to the RS frame subframes correspond to 0, 4, 5, and 9 of the RS frame.

5. The method of claim 1, wherein the subframes that are not configurable as a MBSFN subframe according to the timing applied to the BS frame correspond to subframes 0, 4, 5, and 9 of the BS frame.

6. A base station (BS) in a wireless communication system configured to communicate via a BS frame, the BS frame being a wireless frame that comprises plural subframes, the wireless communication system including the BS, a user equipment (UE) and a relay station (RS), the BS comprising:

a radio frequency (RF) unit; and a processor operatively connected to the RF unit and configured to:

configure, based on both a timing applied to the BS frame and a timing applied to a RS frame, at least one subframe of the BS frame, the at least one subframe for transmitting a signal to the RS by the BS, and transmit the signal to the RS in the configured at least one subframe of the BS frame wherein a subframe of the RS frame corresponding to the at least one subframe of the BS frame is configured as a Multicast Broadcast Single Frequency Network (MBSFN) subframe by the RS, wherein the configuring comprises configuring the at least one subframe per a fixed number of subframes periodically according to the timing applied to the BS frame with an exception of any subframes of the BS frame that are not configurable as an MBSFN subframe according to the timing applied to the RS frame, and wherein subframes of the RS frame that are not configurable as a MBSFN subframe according to the timing applied to the RS frame are fixed.

7. The BS of claim 6, wherein the subframes that are not configurable as a MBSFN subframe according to the timing applied to the RS frame correspond to subframes 0, 4, 5, and 9 of the RS frame.

8. The BS of claim 6, wherein the subframes that are not configurable as a MBSFN subframe according to the timing applied to the BS frame correspond to subframes 0, 4, 5, and 9 of the BS frame.

* * * * *